United States Patent
McDermott (10) Patent No.: US 11,266,260 B1
(45) Date of Patent: *Mar. 8, 2022

(54) RUG TAB, RUG TAB KIT, AND METHOD OF USING THE SAME

(71) Applicant: OPTIMUM TECHNOLOGIES, INC., Cartersville, GA (US)

(72) Inventor: Sean S. McDermott, Atlanta, GA (US)

(73) Assignee: OPTIMUM TECHNOLOGIES, INC., Cartersville, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/380,558

(22) Filed: Apr. 10, 2019

Related U.S. Application Data (60) Division of application No. 15/441,885, filed on Feb. 24, 2017, now Pat. No. 10,292,518, which is a continuation of application No. 15/149,918, filed on May 9, 2016, now abandoned.

(51) Int. Cl.
*A47G 27/04* (2006.01)
*C09J 7/38* (2018.01)

(52) U.S. Cl.
CPC ..... *A47G 27/0418* (2013.01); *A47G 27/0412* (2013.01); *C09J 7/38* (2018.01); *C09J 2301/124* (2020.08)

(58) Field of Classification Search
CPC . C09J 7/21; C09J 7/38; C09J 2400/143; C09J 2400/263; C09J 2401/006; C09J 2301/312; C09J 2301/1242; C09J 2477/006; A47G 27/0418; A47G 27/0412
See application file for complete search history.

(56) References Cited

U.S. PATENT DOCUMENTS

| | | | |
|---|---|---|---|
| 1,509,047 A * | 9/1924 | Lindhorst | A47G 27/0431 16/17.1 |
| 2,042,692 A | 6/1936 | Wurzburg | |
| 3,014,829 A | 12/1961 | Ernest | |
| 3,351,515 A | 11/1967 | Muttera, Jr. | |
| 5,672,402 A | 9/1997 | Kreckel et al. | |
| 5,902,658 A | 5/1999 | Wyman | |
| 6,231,962 B1 | 5/2001 | Bries et al. | |

(Continued)

OTHER PUBLICATIONS

3M Repositionable Tapes, https://multimedia.3m.com/mws/media/1429300/repositionable-tapes-665-666-9415pc-9416-9425-9425ht-9449s.pdf (Year: 2011).

*Primary Examiner* — Patricia L. Nordmeyer
(74) *Attorney, Agent, or Firm* — Duane Morris LLP; Gregory M. Lefkowitz (57) ABSTRACT

A rug tab is provided. The rug tab can include a support material, having an upper side and a lower side; an upper adhesive layer applied on the upper side of the support material; and a lower adhesive layer applied on the lower side of the support material. The rug tab can be designed such that (i) an upper adhesive layer sheer force is at least 25% greater than a lower adhesive layer sheer force, (ii) an upper adhesive layer peel force is at least twice a lower adhesive layer peel force, or (iii) both options (i) and (ii), where the force values are measured one hour after application of a respective upper or lower adhesive layer to a target surface. A method of stabilizing a rug and a kit for stabilizing a rug using the rug tabs are also provided.

20 Claims, 5 Drawing Sheets

(56) References Cited

U.S. PATENT DOCUMENTS

| | | | |
|---|---|---|---|
| 6,509,074 B1 * | 1/2003 | Wyman | A47G 27/0468 |
| | | | 428/40.1 |
| 6,558,786 B1 | 5/2003 | Jupina | |
| 7,182,989 B2 | 2/2007 | Higgins et al. | |
| 7,464,510 B2 | 12/2008 | Scott et al. | |
| 7,721,502 B2 | 5/2010 | Scott et al. | |
| 7,757,457 B2 | 7/2010 | Zah et al. | |
| 8,381,473 B2 | 2/2013 | Scott et al. | |
| 8,468,771 B2 | 6/2013 | Gray et al. | |
| 8,648,771 B2 | 2/2014 | Hwu et al. | |
| 9,085,902 B2 | 7/2015 | Scott et al. | |
| 9,200,183 B2 | 12/2015 | Yao | |
| 10,081,133 B2 | 9/2018 | Zoller | |
| 10,292,518 B1 * | 5/2019 | McDermott | C09J 7/21 |
| 2011/0074128 A1 | 3/2011 | Chang | |
| 2012/0285613 A1 | 11/2012 | Bongiovanni | |
| 2016/0029826 A1 | 2/2016 | Bongiovanni et al. | |
| 2016/0135632 A1 | 5/2016 | Wendling | |
| 2016/0135633 A1 | 5/2016 | Wendling | |
| 2018/0049574 A1 | 2/2018 | Wendling | |

\* cited by examiner

RUG TAB, RUG TAB KIT, AND METHOD OF USING THE SAME

CROSS-REFERENCE TO RELATED APPLICATIONS

This application is a divisional of U.S. patent application Ser. No. 15/441,885, filed Feb. 24, 2017, which is a continuation of U.S. patent application Ser. No. 15/149,918, filed May 9, 2016, the entire contents of which are incorporated herein by reference.

FIELD OF THE INVENTION

The invention is drawn to rug tabs for securing a rug to a target surface, such as a floor or wall, as well as, kits and methods of securing a rug to a target surface.

BACKGROUND OF THE INVENTION

Rugs and mats are frequently displayed in living areas, whether on the floor or on a wall. When displayed on a smooth surface, such as hard wood, tile, marble, etc., the rugs can slide. A variety of techniques have been developed for preventing sliding, including pads placed under the rug.

SUMMARY OF THE INVENTION

In one embodiment, a rug tab is provided. The rug tab can include a support material, having an upper side and a lower side; an upper adhesive layer applied on the upper side of the support material; and a lower adhesive layer applied on the lower side of the support material. The rug tab can be designed such that (i) an upper adhesive layer sheer force is at least 25% greater than a lower adhesive layer sheer force, (ii) an upper adhesive layer peel force is at least twice a lower adhesive layer peel force, or (iii) both options (i) and (ii), where the force values are measured one hour after application of a respective upper or lower adhesive layer to a target surface.

In another embodiment, a method of stabilizing a rug is provided. The method can include providing a rug tab supply, comprising a rug tab as provided herein; applying at least one rug tab from the rug tab supply to an underside of a rug using the upper adhesive layer; and applying the lower adhesive layer of each rug tab to a target surface. As part of the method, each of the at rug tabs is applied proximate to an edge of the rug and each rug tab is spaced apart from the other rug tabs.

In yet another embodiment, a kit for stabilizing a rug is provided. The kit can include a rug tab supply, comprising a rug tab as provided herein, and instructions to the user. The instructions to the user can include applying at least one rug tab from the rug tab supply to an underside of a rug, proximate to an edge of the rug in a spaced apart arrangement, using the upper adhesive layer, and applying the lower adhesive layer of each rug tab to a target surface.

BRIEF DESCRIPTION OF THE DRAWINGS

The features and advantages of the present invention will be more fully disclosed in, or rendered obvious by the following detailed description of the preferred embodiments, which are to be considered together with the accompanying drawings wherein like numbers refer to like parts and further wherein.

DETAILED DESCRIPTION OF THE INVENTION

As shown in FIGS. 1-7, a rug tab 10 that includes a support material 12, having an upper side 14 and a lower side 16; an upper adhesive layer 18 applied on an upper side 14 of the support material 12; and a lower adhesive layer 20 applied on an lower side 16 of the support material 12. In some embodiments, (i) an upper adhesive layer sheer force is at least 25% greater than a lower adhesive layer sheer force, (ii) an upper adhesive layer peel force is at least twice a lower adhesive layer peel force, or (iii) both options (i) and (ii), where the force values are measured one hour after application of an applicable adhesive layer to a target surface (e.g., a rug ("R") or the floor ("F")). The rug tab 10 is adapted for the upper adhesive layer to grip the underside of a rug relatively aggressively, while the lower adhesive layer adheres to the floor well enough to hold the rug in place without damaging the floor. In addition, the rug tab 10 can be easily removed (peeled-up) from the floor (F) by the user and prevents the corners or edges of the rug from rolling up or curling up. As evident from FIGS. 4 and 5, the rug tabs 10 are applied entirely within the area of the rug and do not extend outside the perimeter of the rug.

The description of the preferred embodiments is intended to be read in connection with the accompanying drawings, which are to be considered part of the entire written description of this invention. The drawing figures are not necessarily to scale and certain features of the invention may be shown exaggerated in scale or in somewhat schematic form in the interest of clarity and conciseness. In this description, relative terms such as "horizontal," "vertical," "up," "down," "top," "bottom," as well as derivatives thereof (e.g., "horizontally," "downwardly," "upwardly," etc.) should be construed to refer to the orientation as then described or as shown in the drawing figure under discussion. These relative terms are for convenience of description and normally are not intended to require a particular orientation. Terms including "inwardly" versus "outwardly," "longitudinal" versus "lateral" and the like are to be interpreted relative to one another or relative to an axis of elongation, or an axis or center of rotation, as appropriate. Terms concerning attachments, coupling and the like, such as "connected" and "interconnected," refer to a relationship wherein structures are secured or attached to one another either directly or indirectly through intervening structures, as well as both moveable or rigid attachments or relationships, unless expressly described otherwise, and includes terms such as "directly" coupled, secured, etc. The term "operatively coupled" is such an attachment, coupling, or connection that allows the pertinent structures to operate as intended by virtue of that relationship. As used herein, the term "rug" is intended to encompass rugs, as well as, mats.

In some embodiments, the rug tab 10 has a shape selected from the group consisting of a rectangle, a square, a triangle, a strip, a circle, and an ellipse.

In some embodiments, the support material 12 is selected from the group consisting of a permeable material (i.e., a material comprising spaces therein) and an impermeable material. In some embodiments, the support material 12 is a flexible material, a foldable material, or both. In some embodiments, the support material 12 is formed from a fabric, a scrim, a mesh, and a film. In some embodiments, the support material 12 is formed from a material selected from the group consisting of nylon, rayon, polyester, polypropylene, polyethylene, polyester, fiberglass, paper, and polystyrene.

Figure 3:
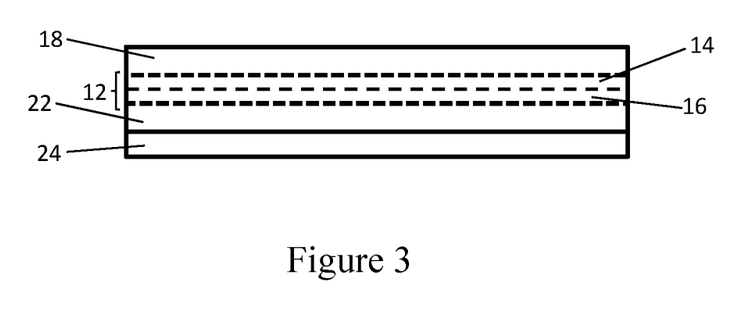
FIG. 3 is a cross-sectional view of another rug tab as described herein.

In some embodiments, as shown in FIG. 3, the upper adhesive layer 18, the lower adhesive layer 20, or both extend into spaces within the support material 12. In some embodiments, the support material 12 is a fabric (including a scrim or mesh) and the upper adhesive layer 18, the lower adhesive layer 20, or a combination of both encapsulate the fibers forming the support material 12.

Figure 1A:
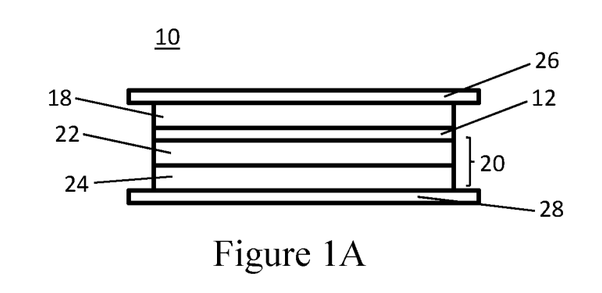
FIG. 1A is a cross-sectional view of a rug tab as described herein.
Figure 1B:
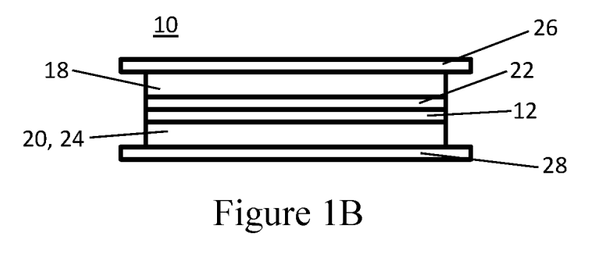
FIG. 1B is a cross-sectional view of another rug tab as described herein.
Figure 1C:
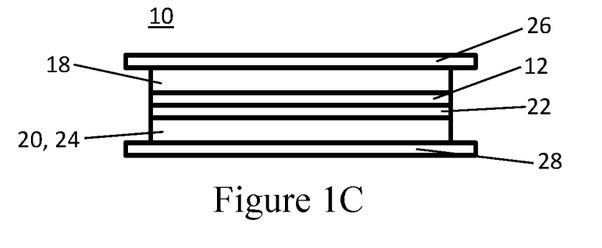
FIG. 1C is a cross-sectional view of another rug tab as described herein.
Figure 2:
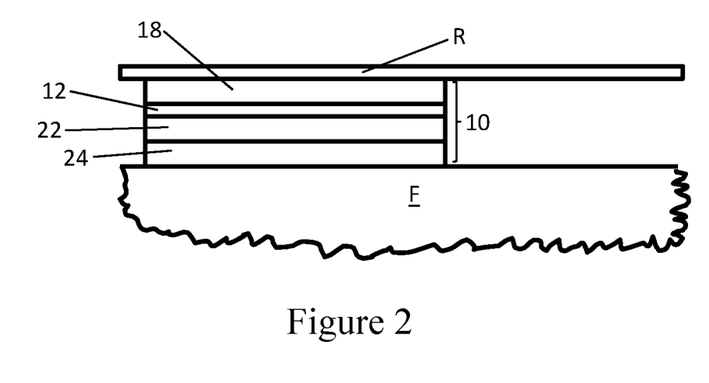
FIG. 2 is a cross-sectional view of a rug tab attached to a rug and the floor as described herein.

In some embodiments, a barrier layer 22 is located between the upper adhesive layer 18 and the lower adhesive layer 20. In some embodiments, as shown in FIGS. 1A and 3, a portion of the barrier layer 22 is embedded within the support material 12. In some embodiments, as shown in FIGS. 1B and 3, the barrier layer 22 is above the upper side 14 of the support material 12. In some embodiments, as shown in FIGS. 1C and 3, the barrier layer 22 is below the lower side 16 of the support material 12. In some embodiments, the support material 12 is the barrier layer 22. In some embodiments, the barrier layer 22 is selected from the group consisting of a film, a polymer, and an adhesive. In some embodiments, the barrier layer 22 comprises a permanent adhesive (e.g., a permanent acrylic adhesive), while the barrier layer 22 comprises a releasable adhesive (e.g., a releasable acrylic adhesive) in other embodiments. As used herein, "barrier layer" is user to reference a layer that enables the lower adhesive layer 20 and the upper adhesive layer 18 to maintain the claimed peel force and sheer force properties for a period of at least one year under standard storage conditions. This ensures that the lower adhesive layer 20 will adhere to the target surface (e.g., a wall, a floor, a table, cushion to a chair, picture to a refrigerator, etc.) during use, but is easily peeled from the floor by the user over the lifetime of the rug tab 10 without causing damage to the floor (F). Although the specification refers to the floor as an example of a target surface, it will be understood that floor is merely an example of a target surface and the methods and instructions disclosed herein apply to other target surfaces (e.g., walls) where a rug may be displayed or used.

In some embodiments, the lower adhesive layer 20 comprises an adhesive-based barrier layer 22 and a releasable pressure sensitive lower adhesive layer 24, wherein a portion of the barrier layer 22 is between the support material 12 and the releasable pressure sensitive adhesive layer 24. In some embodiments, the barrier layer 22 is a permanent adhesive barrier layer. In some embodiments, the barrier layer 22 is selected from a hot-melt adhesive and a dispersion adhesive.

In some embodiments, the upper adhesive layer 20 is a releasable, pressure sensitive adhesive. In some embodiments, the upper adhesive layer 20 is applied as an acrylic dispersion.

In some embodiments, the rug tab 10 includes an upper releasable liner 26, where the upper adhesive layer 18 is between the upper side 14 and the upper releasable liner 26. In some embodiments, the rug tab 10 includes a lower releasable liner 28, where the lower adhesive layer 20 is between the lower side 16 and the lower releasable liner 28.

Figure 6:
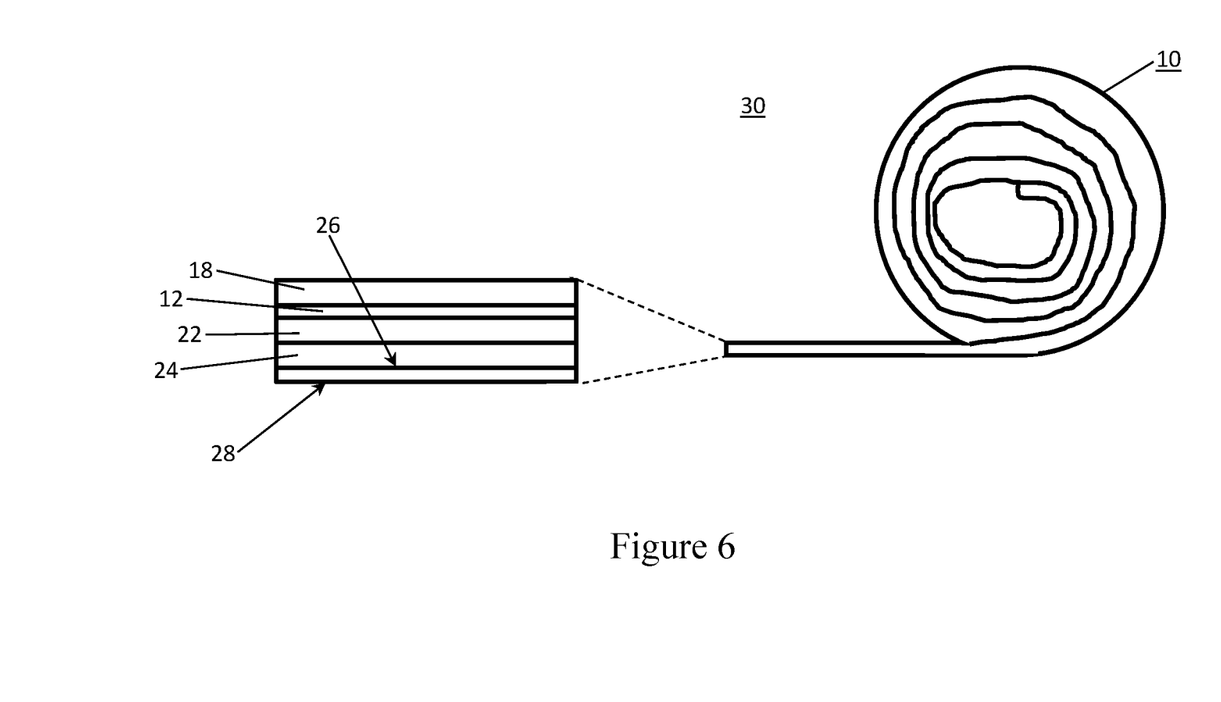
FIG. 6 is a side view of a rug tab strip that is rolled so that opposite sides of the same releasable liner serve as the upper and lower releasable liner.

As shown in FIG. 6, the rug tab 10 is a strip that is rolled and the upper releasable liner 26 and the lower releasable liner 28 are opposite sides of the same releasable liner.

In some embodiments, the upper adhesive layer sheer force at one hour is at least 35 pounds per square inch (psi), or at least 37.5 psi, or at least 40 psi, or at least 42.5 psi, or at least 45 psi. In some embodiments, the upper adhesive layer sheer force at twenty-four hours is at least 35 psi, or at least 37.5 psi, or at least 40 psi, or at least 42.5 psi, or at least 45 psi.

In some embodiments, the lower adhesive layer sheer force at one hour is at least 20 psi, or at least 22.5 psi, or at least 25 psi, or at least 27.5 psi, or at least 30 psi. In some embodiments, the lower adhesive layer sheer force at twenty-four hours is at least 20 psi, or at least 22.5 psi, or at least 25 psi, or at least 27.5 psi, or at least 30 psi, or at least 32.5 psi.

In some embodiments, the lower adhesive layer sheer force at one hour is 40 psi or less, or 39 psi or less, or 38 psi or less, or 37 psi or less, or 36 psi or less, or 35 psi or less, or 34 psi or less, or 33 psi or less. In some embodiments, the lower adhesive layer sheer force at twenty-four hours is 40 psi or less, or 39 psi or less, or 38 psi or less, or 37 psi or less, or 36 psi or less.

In some embodiments, the upper adhesive layer peel force at one hour is at least 2.5 psi, or at least 2.75 psi, or at least 3 psi, or at least 3.25 psi, or at least 3.5 psi. In some embodiments, the upper adhesive layer peel force at twenty-four hours is at least 2.5 psi, or at least 2.75 psi, or at least 3 psi, or at least 3.25 psi, or at least 3.5 psi, or at least 3.75 psi.

In some embodiments, the lower adhesive layer peel force at one hour is at least 0.5 psi, or at least 0.6 psi, or at least 0.7 psi, or at least 0.75 psi. In some embodiments, the lower adhesive layer peel force at twenty-four hours is at least 0.5 psi, or at least 0.6 psi, or at least 0.7 psi, or at least 0.75 psi, or at least 0.8 psi, or at least 0.85 psi.

In some embodiments, the lower adhesive layer peel force at one hour is 1.5 psi or less, or 1.3 psi or less, or 1.1 psi or less, or 1.0 psi or less, or 0.9 psi or less. In some embodiments, the lower adhesive layer peel force at twenty-four hours is 1.5 psi or less, or 1.3 psi or less, or 1.1 psi or less, or 1.0 psi or less, or 0.95 psi or less.

The sheer force values reported herein are obtained using ASTM D6004 with a stainless steel underlayment. The peel force values reported herein are obtained using ASTM D3167 with a stainless steel as the rigid adherend. The only change was that a one day test was performed instead of a ten day test.

In some embodiments, the one hour sheer force for the upper adhesive layer is at least 35% greater than the one hour sheer force of the lower adhesive layer. In some embodiments, the one hour sheer force for the upper adhesive layer is at least 37.5% greater than, or at least 40% greater than, or at least 42.5% greater than, or at least 45% greater than, the one hour sheer force of the lower adhesive layer.

In some embodiments, the twenty-four hour sheer force for the upper adhesive layer is at least 27.5% greater than the twenty-four hour sheer force of the lower adhesive layer. In some embodiments, the twenty-four hour sheer force for the upper adhesive layer is at least 30% greater than, or at least 32.5% greater than, or at least 35% greater than, or at least 37% greater than, the twenty-four hour sheer force of the lower adhesive layer.

In some embodiments, the one hour peel force for the upper adhesive layer is at least 3 times the one hour peel force of the lower adhesive layer. In some embodiments, the one hour peel force for the upper adhesive layer is at least 3.5 times, or at least 3.75 times, or at least 4 times, or at least 4.25 times, or at least 4.5 times the one hour peel force of the lower adhesive layer.

In some embodiments, the twenty-four hour peel force for the upper adhesive layer is at least 3 times the twenty-four hour peel force of the lower adhesive layer. In some embodiments, the twenty-four hour peel force for the upper adhesive layer is at least 3.25 times, or at least 3.5 times, or at least 3.75 times, or at least 4 times, or at least 4.25 times the twenty-four hour peel force of the lower adhesive layer.

Figure 4:
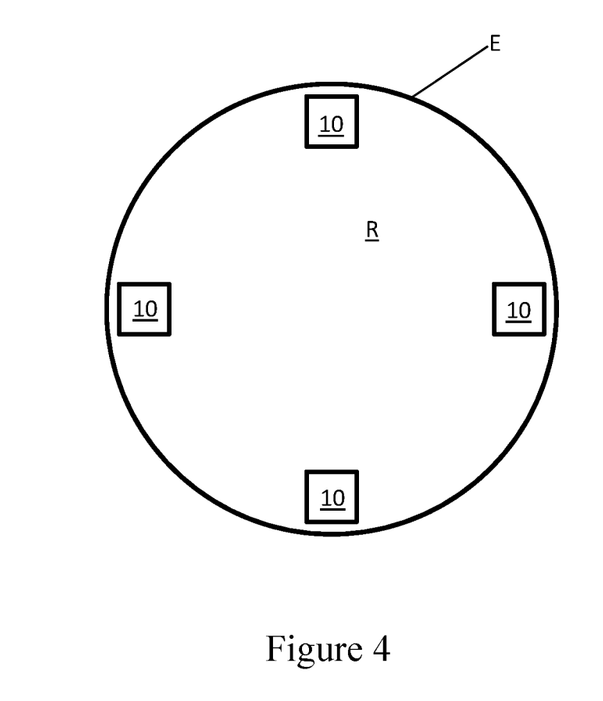
FIG. 4 is a bottom view of a circular rug with rug tabs attached as described herein.

In another embodiment, a method of stabilizing a rug is disclosed. The method can include providing a rug tab supply 30. The rug tab supply 30 can include a support material 12, having an upper side 14 and a lower side 16; an upper adhesive layer 18 applied on an upper side 14 of the support material 12; and a lower adhesive layer 20 applied on a lower side 16 of the support material 12. In some embodiments, (i) an upper adhesive layer sheer force is at least 25% greater than a lower adhesive layer sheer force, (ii) an upper adhesive layer peel force is at least twice a lower adhesive layer peel force, or (iii) both options (i) and (ii), wherein force values are measured one hour after application of an applicable adhesive layer to a target surface. The rug tab supply 30 can include any of the rug tabs 10 described herein. The method can also include applying at least one rug tab 10 (or at least two rug tabs 10, or at least three rug tabs 10, at least four rug tabs 10) from the rug tab supply 30 to an underside of a rug (R) using the upper adhesive layer 18; and applying the lower adhesive layer 20 of each rug tab 10 to a floor (F). The resulting configuration is shown in cross-section in FIG. 2. The method can include applying each of the rug tabs proximate to an edge (E) of the rug (R) and each rug tab 10 is spaced apart from the other rug tabs 10, as shown in FIGS. 4 & 5.

Figure 5:
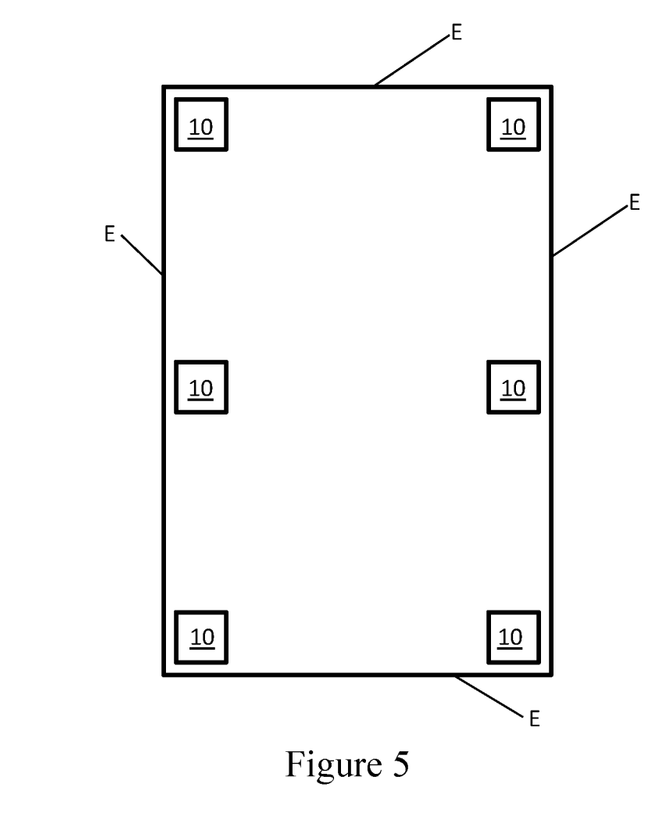
FIG. 5 is a bottom view of a rectangular rug with rug tabs attached as described herein.

As shown in FIG. 5, in some embodiments, the rug (R) comprises at least four corners, and the method includes applying a rug tab 10 proximate to each of the at least four corners. In some embodiments, as shown in FIG. 5, at least one rug tab is placed proximate to an edge (E) of the rug (R) between two adjacent corners of the rug (R). In some embodiments, the rug tab supply 30 comprises at least four rectangular rug tabs 10.

In some embodiments, where the rug tabs 10 include an upper releasable liner 26, the method includes removing the upper releasable liner 26 prior to applying the upper adhesive layer 18 of the rug tab 10 to the underside of the rug (R). In some embodiments, where the rug tabs 10 include a lower releasable liner 28, the method includes removing the lower releasable liner 28 prior to applying the lower adhesive layer 20 of the rug tab 10 to the floor (F).

In some embodiments, the rug tab supply 30 comprises a strip that is rolled and the upper releasable liner 26 and the lower releasable liner 28 are opposite sides of the same releasable liner. In some such embodiments, the method comprises cutting or tearing the rug tab supply 30 to form at least four rug tabs 10.

Figure 7:
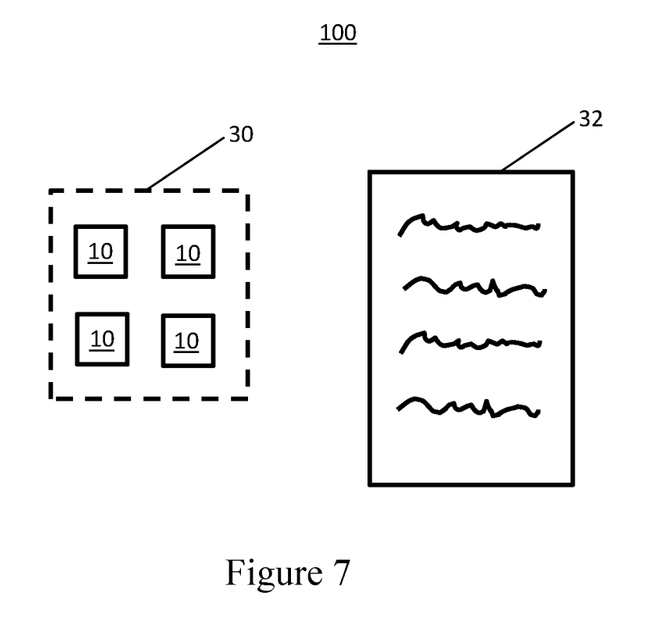
FIG. 7 is a schematic view of a rug tab kit as described herein.

In another embodiment, a kit 100 for stabilizing a rug is disclosed. As shown in FIG. 7, the kit includes a rug tab supply 30 comprising any of the rug tabs 10 as described herein and instructions 32 for using the rug tabs 10. The instructions 32 include applying at least one rug tab 10 (or at least two rug tabs 10, or at least three rug tabs 10, or at least four rug tabs 10) from the rug tab supply 30 to an underside of a rug (R) proximate to an edge (E) of the rug in a spaced apart arrangement, using the upper adhesive layer 18; and applying the lower adhesive layer 20 of each rug tab 10 to a floor (F). The instructions 32 can also include applying a rug tab 10 proximate each of the at least four corners of a square rug or rectangular rug, as shown in FIG. 5. The instructions can include any combination of the method steps described herein.

In some embodiments, the upper releasable liner 26 and the lower releasable liner 28 are different in appearance so that the user can easily distinguish between the upper side, which is adapted for adhesion (permanent or releasable) to a rug, and the lower side, which is adapted for releasable adhesion to the target surface. In some embodiments, the instructions identify include reference to the difference in appearance so that the user knows which side of the rug tab 10 to apply to the rug (R) and which side of the rug tab 10 to apply to the target surface (e.g., floor or wall). In some embodiments, the upper releasable liner 26 and the lower releasable liner 28 can be distinguishable based on the presence or absence of printing, different printing, different colors, different patterns, or other differences in appearance that are recognizable by the user, particularly when referenced by the instructions 32.

EXAMPLES

A rug tab consistent with the structure disclosed in FIG. 1A was produced using a rayon scrim as the support material, a permanent acrylic dispersion adhesive applied to the rayon scrim as the barrier layer and a releasable acrylic dispersion applied to the rayon scrim as the upper adhesive layer. The lower adhesive layer was applied to the permanent acrylic dispersion adhesive. The upper and lower adhesive layers of the rug tab were then evaluated for peel strength and sheer strength using ASTM 3167 and ASTM D6004, respectively. The peel strength and sheer strength were recorded 1 hour after application of the adhesive to the target surface and 24 hours after application of the adhesive to the target surface. The resulting values were as follows:

|  | 1 Hour | 24 Hours |
|---|---|---|
| Upper Adhesive Layer | | |
| Sheer | 45.7 psi | 48.3 psi |
| Peel | 3.7 psi | 3.9 psi |
| Lower Adhesive Layer | | |
| Sheer | 31.4 psi | 35 psi |
| Peel | 0.8 psi | 0.9 psi |

It was determined that these values allowed the upper adhesive layer to be aggressively attached to the rug without damage upon removal and, similarly, allowed the lower adhesive layer to be temporarily attached to the target surface without causing damage upon removal.

The sheer force values reported herein are obtained using ASTM D6004 with a stainless steel underlayment. The peel force values reported herein are obtained using ASTM D3167 with a stainless steel as the rigid adherend.

The foregoing is provided for purposes of illustrating, explaining, and describing embodiments of this invention. Modifications and adaptations to these embodiments will be apparent to those skilled in the art and may be made without departing from the scope or spirit of this invention.

What is claimed is:

1. A securable surface comprising:
   a rug, having a perimeter defined by a perimeter edge, and
   at least one adhesive tab, wherein each of the at least one adhesive tabs comprises:
      a flexible support material, having an upper side and a lower side;
      an upper adhesive layer applied above the upper side of the flexible support material;
      a lower adhesive layer applied below the lower side of the flexible support material, wherein the lower adhesive layer is a releasable, pressure-sensitive adhesive;
   wherein the upper adhesive layer is coupled to the rug;
   wherein the securable surface is adapted to be releasably adhered to a target surface, while remaining intact;
   wherein (i) an upper adhesive layer sheer force is at least 25% greater than a lower adhesive layer sheer force, (ii) an upper adhesive layer peel force is at least twice a lower adhesive layer peel force, or (iii) both options (i) and (ii), wherein force values are measured at least one hour after application of a respective upper or lower adhesive layer to the target surface; and
   wherein each of the at least one adhesive tabs is positioned completely within the perimeter and is adapted to prevent edges of the securable surface from rolling or curling up after the securable surface is applied to a target surface via the releasable, pressure-sensitive adhesive of the lower adhesive layer.

2. The securable surface of claim 1, wherein the lower adhesive layer comprises a barrier layer and a releasable pressure sensitive lower adhesive layer, wherein a portion of the barrier layer is between the flexible support material and the releasable pressure sensitive lower adhesive layer.

3. The securable surface of claim 1, wherein the flexible support material comprises spaces therein.

4. The securable surface of claim 3, wherein the upper adhesive layer, the lower adhesive layer, or both extend into the spaces within the flexible support material.

5. The securable surface of claim 1, wherein, after at least 1 hour, the upper adhesive layer sheer force is at least 35 psi and the lower adhesive layer sheer force is at least 20 psi.

6. The securable surface of claim 1, wherein the at least one adhesive tab is adapted to prevent the securable surface from moving after the securable surface is applied to a target surface via the lower adhesive layer.

7. The securable surface of claim 1, wherein (i) after at least 1 hour, the upper adhesive layer sheer force is at least 35% greater than the lower adhesive layer sheer force, (ii) after at least 1 hour, the upper adhesive layer peel force is at least three times the lower adhesive layer peel force, or (iii) both options (i) and (ii).

8. The securable surface of claim 1, wherein, after at least 1 hour, the lower adhesive layer peel force is 1.5 psi or less.

9. The securable surface of claim 1, wherein (i) an upper adhesive layer sheer force is at least 25% greater than a lower adhesive layer sheer force, (ii) an upper adhesive layer peel force is at least twice a lower adhesive layer peel force, or (iii) both options (i) and (ii), wherein force values are measured twenty-four hours after application of a respective upper or lower adhesive layer to a target surface.

10. The securable surface of claim 1, further comprising:
   a lower releasable liner, wherein the lower adhesive layer is between the lower side of the flexible support material and the lower releasable liner.

11. The securable surface of claim 1, wherein the securable surface comprises exactly one adhesive tab.

12. The securable surface of claim 1, wherein (i) an upper adhesive layer sheer force is at least 25% greater than a lower adhesive layer sheer force.

13. The securable surface of claim 1, wherein (ii) an upper adhesive layer peel force is at least twice a lower adhesive layer peel force.

14. The securable surface of claim 1, wherein (i) an upper adhesive layer sheer force is at least 25% greater than a lower adhesive layer sheer force, (ii) an upper adhesive layer peel force is at least twice a lower adhesive layer peel force, or (iii) both options (i) and (ii), wherein force values are measured one hour after application of a respective upper or lower adhesive layer to the target surface.

15. A method of securing a securable surface, comprising:
   providing a securable surface, and
   adhering the securable surface to a target surface, wherein the securable surface comprises:
      a rug, having a perimeter defined by a perimeter edge, and
      at least one adhesive tab, wherein each of the at least one adhesive tabs comprises:
         a flexible support material, having an upper side and a lower side;
         an upper adhesive layer applied above the upper side of the flexible support material;
         a lower adhesive layer applied below the lower side of the flexible support material, wherein the lower adhesive layer is a releasable, pressure-sensitive adhesive;
      wherein the upper adhesive layer is coupled to the rug;
      wherein the securable surface is adapted to be releasably adhered to a target surface, while remaining intact;
      wherein (i) an upper adhesive layer sheer force is at least 25% greater than a lower adhesive layer sheer force, (ii) an upper adhesive layer peel force is at least twice a lower adhesive layer peel force, or (iii) both options (i) and (ii), wherein force values are measured at least one hour after application of a respective upper or lower adhesive layer to the target surface; and
      wherein each of the at least one adhesive tabs is positioned completely within the perimeter and is adapted to prevent edges of the securable surface from rolling or curling up after the securable surface is applied to a target surface via the releasable, pressure-sensitive adhesive of the lower adhesive layer.

16. The method of claim 15, wherein the securable surface is adhered to the first surface via the lower adhesive layer.

17. The method of claim 15, wherein the securable surface comprises exactly one adhesive tab.

18. The method of claim 17, wherein the exactly one adhesive tab is adapted to prevent edges of the securable surface from rolling or curling up after the securable surface is applied to the target surface via the lower adhesive layer; and wherein the exactly one adhesive tab is adapted to prevent the securable surface from moving after the securable surface is applied to a target surface via the lower adhesive layer.

19. The method of claim 15, wherein the adhesive tab further comprises a lower releasable liner, wherein the lower adhesive layer is between the lower side of the flexible support material and the lower releasable liner, and wherein the method further comprises removing the lower releasable liner prior to the adhering step.

20. The method of claim 15, wherein, after at least 1 hour, the upper adhesive layer sheer force is at least 35 psi and the lower adhesive layer sheer force is at least 20 psi.

\* \* \* \* \*